United States Patent
Naedler et al.

(10) Patent No.: US 10,815,989 B2
(45) Date of Patent: Oct. 27, 2020

(54) QUICK PULL VALVE AND SEAT ASSEMBLY

(71) Applicant: UTEX INDUSTRIES, INC., Houston, TX (US)

(72) Inventors: Mark Henry Naedler, Cypress, TX (US); Ricardo Jose Betancourt, Katy, TX (US); William Stephen Colburn, Katy, TX (US)

(73) Assignee: UTEX INDUSTRIES, INC., Houston, TX (US)

( * ) Notice: Subject to any disclaimer, the term of this patent is extended or adjusted under 35 U.S.C. 154(b) by 0 days.

(21) Appl. No.: 16/748,458

(22) Filed: Jan. 21, 2020

(65) Prior Publication Data

US 2020/0240407 A1    Jul. 30, 2020

Related U.S. Application Data

(60) Provisional application No. 62/870,307, filed on Jul. 3, 2019, provisional application No. 62/798,767, filed on Jan. 30, 2019.

(51) Int. Cl.

| | |
|---|---|
| *F16K 1/42* | (2006.01) |
| *F04B 53/10* | (2006.01) |
| *F16K 1/44* | (2006.01) |
| *F16K 15/02* | (2006.01) |
| *F16K 1/46* | (2006.01) |
| *F16K 1/12* | (2006.01) |

(52) U.S. Cl.
CPC .......... *F04B 53/1087* (2013.01); *F16K 1/443* (2013.01); *F16K 15/021* (2013.01); *F16K 1/12* (2013.01); *F16K 1/46* (2013.01)

(58) Field of Classification Search
CPC ..... F04B 53/1087; F16K 1/443; F16K 15/021
USPC .......................................................... 251/363
See application file for complete search history.

(56) References Cited

U.S. PATENT DOCUMENTS

| | | | |
|---|---|---|---|
| 2,898,082 A | 8/1959 | Von Almen et al. | |
| 2,969,951 A * | 1/1961 | Walton | F04B 53/1027 251/332 |
| 3,327,635 A | 6/1967 | Sachnik | |
| 3,489,170 A * | 1/1970 | Leman | F16K 1/385 137/516.29 |
| 4,518,329 A | 5/1985 | Weaver | |
| 5,193,577 A | 3/1993 | De Koning | |
| 8,317,498 B2 | 11/2012 | Gambier et al. | |
| 2002/0134961 A1 * | 9/2002 | Antoff et al. | F04B 53/1025 251/363 |
| 2016/0160848 A1 | 6/2016 | Toppings et al. | |

FOREIGN PATENT DOCUMENTS

EP           237112 A1    9/1987

* cited by examiner

*Primary Examiner* — Kevin L Lee
(74) *Attorney, Agent, or Firm* — Haynes and Boone, LLP

(57) ABSTRACT

A valve seat assembly comprises a valve. The assembly further comprises a removable upper seat associated with the valve. The assembly further comprises a lower seat configured to be inserted into a fluid end of a pump and releasably couplable to the upper seat. The upper seat is decouplable from the lower seat while the lower seat remains inserted in the fluid end of the pump. The valve is configured to contact the upper seat to prevent a flow of fluid through the fluid end of the pump.

25 Claims, 11 Drawing Sheets

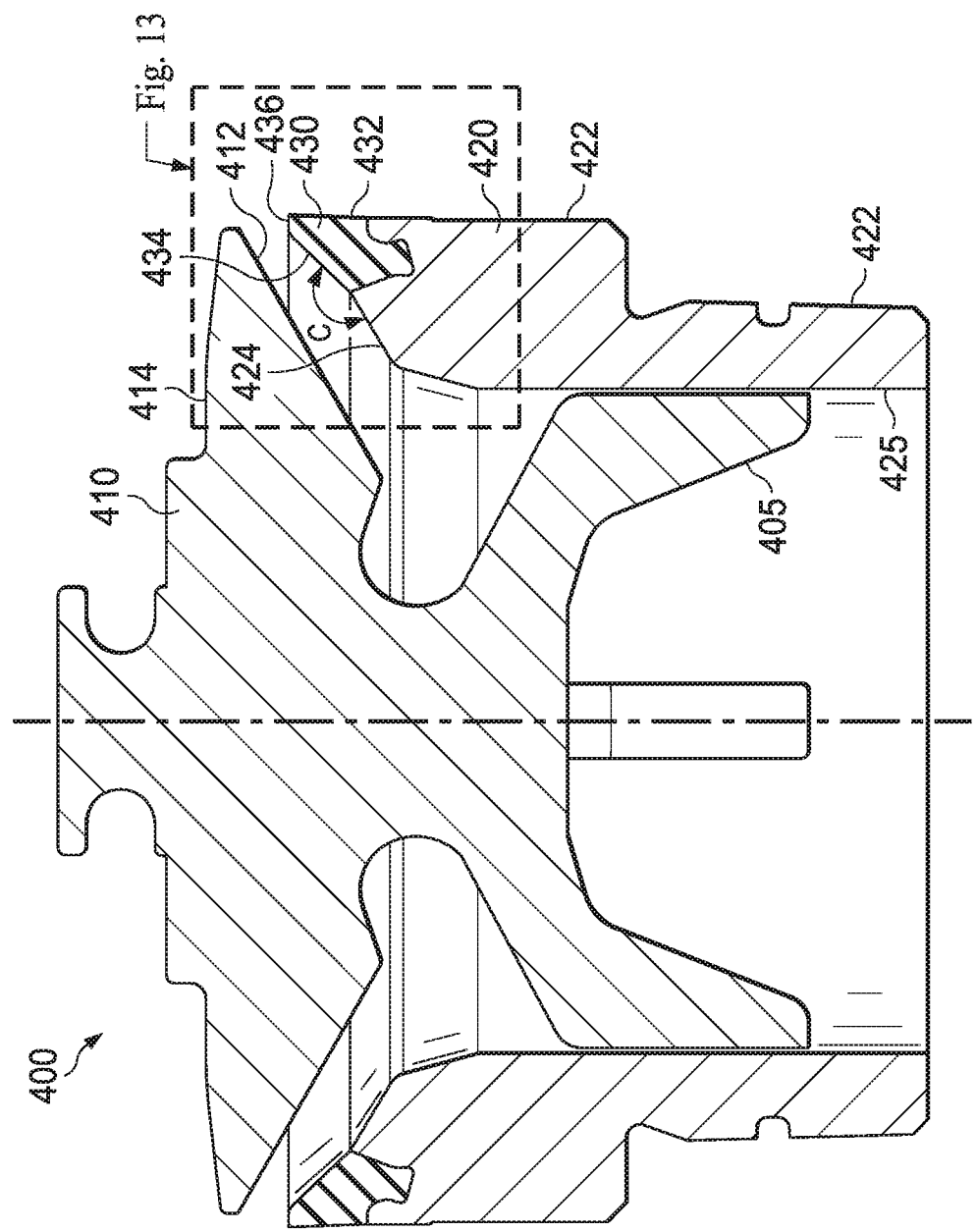

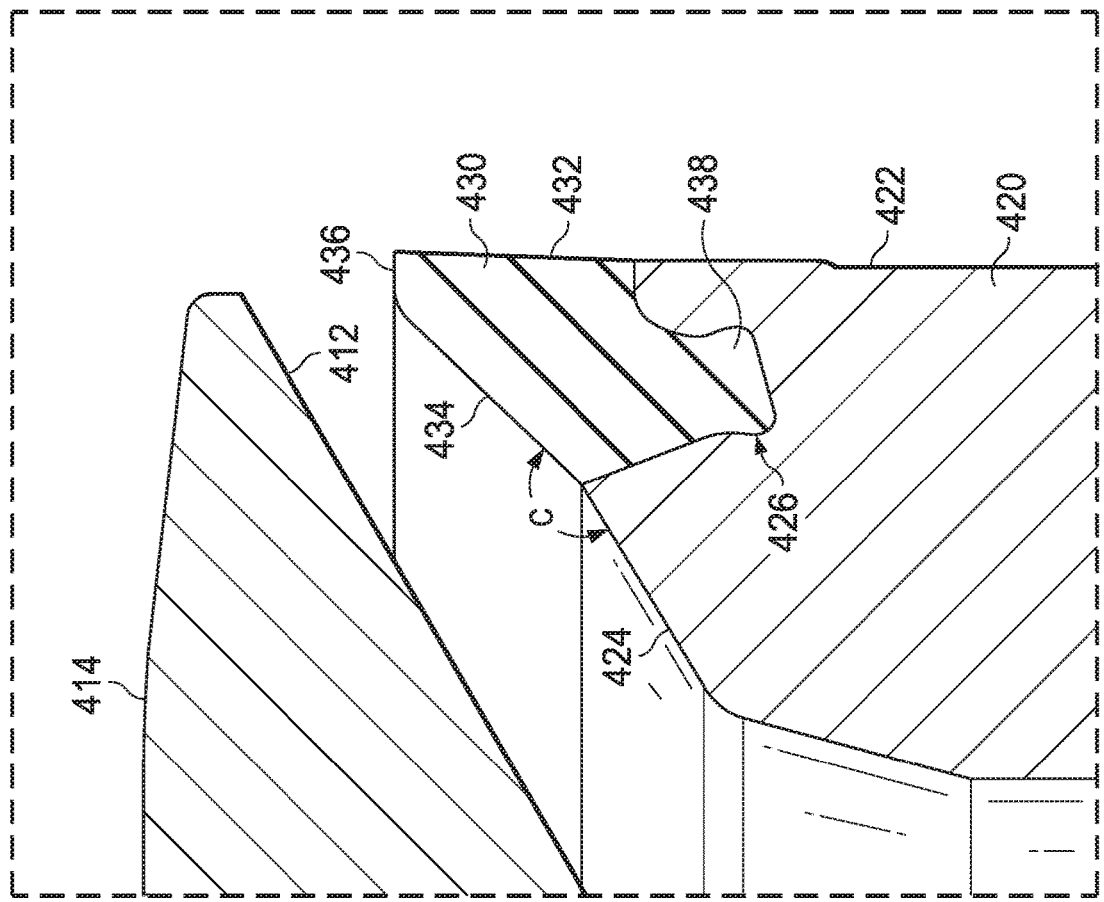

QUICK PULL VALVE AND SEAT ASSEMBLY

PRIORITY

This application claims the benefit of U.S. Provisional Application 62/798,767, filed Jan. 30, 2019 and U.S. Provisional Application 62/870,307, filed Jul. 3, 2019, which are incorporated in their entirety herein by reference.

BACKGROUND

Well service positive displacement pumps face a challenge not typically seen. The fluid carries proppant, a very hard and abrasive particulate including sand. This is especially wearing on components within the pump's fluid end, and the fluid end itself. Both suction valves and discharge valves within the pump must close upon proppant laden media with every stroke of the plunger. Proppant is pulverized while it grinds between the strike face of the valves and their seats. Despite employing very hard materials, the valves and seats have to be replaced relatively often. Small leaks between the valve and seat quickly result in washed out metal, since the high pressure abrasive fluid cuts through metal.

The valve seat in a conventional well service pump has a tapered interference press fit with the pump's fluid end. The pump's fluid end weighs thousands of pounds and is very expensive relative to the internal components such as the valve seats. The great expense of the fluid end is one reason traditional seats are pressed in with such interference that it can require a hydraulic jack delivering tons of force to pull a worn seat. A leak past the seat and fluid end usually results in fluid abrasion into the fluid end rendering the fluid end scrapped. Each time a tapered seat is pulled from a fluid end, there is a risk of contaminants such as sand not being properly removed and potentially providing a leak path between the tapered seat and the fluid end. Therefore, a need exists for a valve and seat assembly that prevents leak paths between the seat and the fluid end of the pump, where the seat is easily replaceable.

Accordingly, there is a need for additional well service valve and seat assemblies that may address at least one of the deficiencies in the state of the art, whether stated above or unstated.

BRIEF SUMMARY OF THE INVENTION

In the systems and devices of the present disclosure, the fluid end is tapered to receive a press fitted seat. A lower seat section presses a tapered fit into the fluid end. An upper seat fits within the lower seat and relies on a seal to keep fluid from passing, and a mechanical latch holds the inner seal in place as its corresponding valve opens and closes. The design results in two major advantages. First, a heavy hydraulic jack is not required to pull a seat with a worn strike face. This saves considerable time and labor for the operator at a well site. The upper seat can be removed with manual force to overcome the latch. Second, the present invention will result in fewer required valve changes since operators will change the seat with every valve change. It is presently common in the industry to install new valves on worn seats since pulling seats is laborious and time consuming. Having a fresh seat strike face with every valve change will result in considerably longer average valve life and will reduce the time spent replacing valves as well as seats.

Another advantage of the present invention is that the elastomeric like seal, which may be urethane, for example, included in the valve and seat arrangement can be placed on the upper seat section rather than on the valve. Conventional well service valve and seat assemblies place the seal onto the valve, rather than the seat. When the conventional valve is pressed upon the seat with pressure, the tapered seat surface compresses at least some of the seal material inward, resulting in high internal stresses. When the valve of the present invention is pressed onto the seat, the seal is free to expand outward, resulting in relatively low internal stresses. When the valve is open, the seal is able to deflect and reduce restriction of the fluid flow. When the valve is closed, the seal is able to deflect inward under pressure and form a seal with the valve, even after significant amounts of the elastomeric seal have worn away.

Consistent with some embodiments, a valve seat assembly is provided. The assembly includes a valve and a removable upper seat associated with the valve. The assembly further includes a lower seat configured to be inserted into a fluid end of a pump and releasably couplable to the upper seat. The upper seat is decouplable from the lower seat while the lower seat remains inserted in the fluid end of the pump. The valve is configured to contact the upper seat to prevent a flow of fluid through the fluid end of the pump.

Consistent with other embodiments, a valve seat assembly is provided. The assembly includes a valve including an engagement surface. The assembly further includes a seal configured to prevent a flow of fluid through a fluid end of a pump. The assembly further includes a removable upper seat including an engagement surface. The assembly further includes a lower seat configured to be inserted into the fluid end of the pump and to be releasably couplable to the upper seat. The upper seat is decouplable from the lower seat while the lower seat remains inserted in the fluid end of the pump. The engagement surface of the valve is configured to contact the seal and the engagement surface of the upper seat to prevent the flow of fluid through the fluid end of the pump.

Consistent with other embodiments, a valve seat assembly is provided. The assembly includes a valve including an engagement surface. The assembly further includes a seat insertable into a fluid end of a pump, and the seat includes an engagement surface. The assembly further includes a seal coupled to the seat. The seal is configured to prevent a flow of fluid through the fluid end of the pump, and the seal includes a contact surface. The engagement surface of the valve is configured to contact the seal and the engagement surface of the seat to prevent the flow of fluid through the fluid end of the pump. The contact between the engagement surface of the valve and the engagement surface of the seat is continuous along the engagement surface of the seat. The engagement surface of the valve is configured to contact the seal before contacting the engagement surface of the seat.

A generalized valve seat assembly includes a valve. The assembly further includes a removable upper seat associated with the valve. The assembly further includes a lower seat configured to be inserted into a fluid end of a pump and releasably couplable to the upper seat. The upper seat is decouplable from the lower seat while the lower seat remains inserted in the fluid end of the pump. The valve is configured to contact the upper seat to prevent a flow of fluid through the fluid end of the pump.

An additional generalized valve seat assembly includes a valve including an engagement surface. The assembly further includes a seal configured to prevent a flow of fluid through a fluid end of a pump. The assembly further includes a removable upper seat including an engagement surface. The assembly further includes a lower seat configured to be inserted into the fluid end of the pump and releasably couplable to the upper seat. The upper seat is decouplable from the lower seat while the lower seat remains inserted in the fluid end of the pump. The engagement surface of the valve is configured to contact the seal and the engagement surface of the upper seat to prevent the flow of fluid through the fluid end of the pump.

An additional generalized valve seat assembly includes a valve including an engagement surface. The assembly further includes a seat insertable into a fluid end of a pump, and the seat includes an engagement surface. The assembly further includes a seal coupled to the seat. The seal is configured to prevent a flow of fluid through the fluid end of the pump, and the seal includes a contact surface. The engagement surface of the valve is configured to contact the seal and the engagement surface of the seat to prevent the flow of fluid through the fluid end of the pump. The contact between the engagement surface of the valve and the engagement surface of the seat is continuous along the engagement surface of the seat. The engagement surface of the valve is configured to contact the seal before contacting the engagement surface of the seat.

BRIEF DESCRIPTION OF THE DRAWINGS

The accompanying drawings illustrate embodiments of the devices and methods disclosed herein and together with the description, serve to explain the principles of the present disclosure.

FIG. 12 is a sectioned view of an alternative valve and seat assembly with the valve in an open position according to one or more aspects of the present disclosure.

FIG. 13 is a sectioned view of a seal of the alternative valve and seat assembly of FIG. 12 according to one or more aspects of the present disclosure.

DETAILED DESCRIPTION

Figure 1:
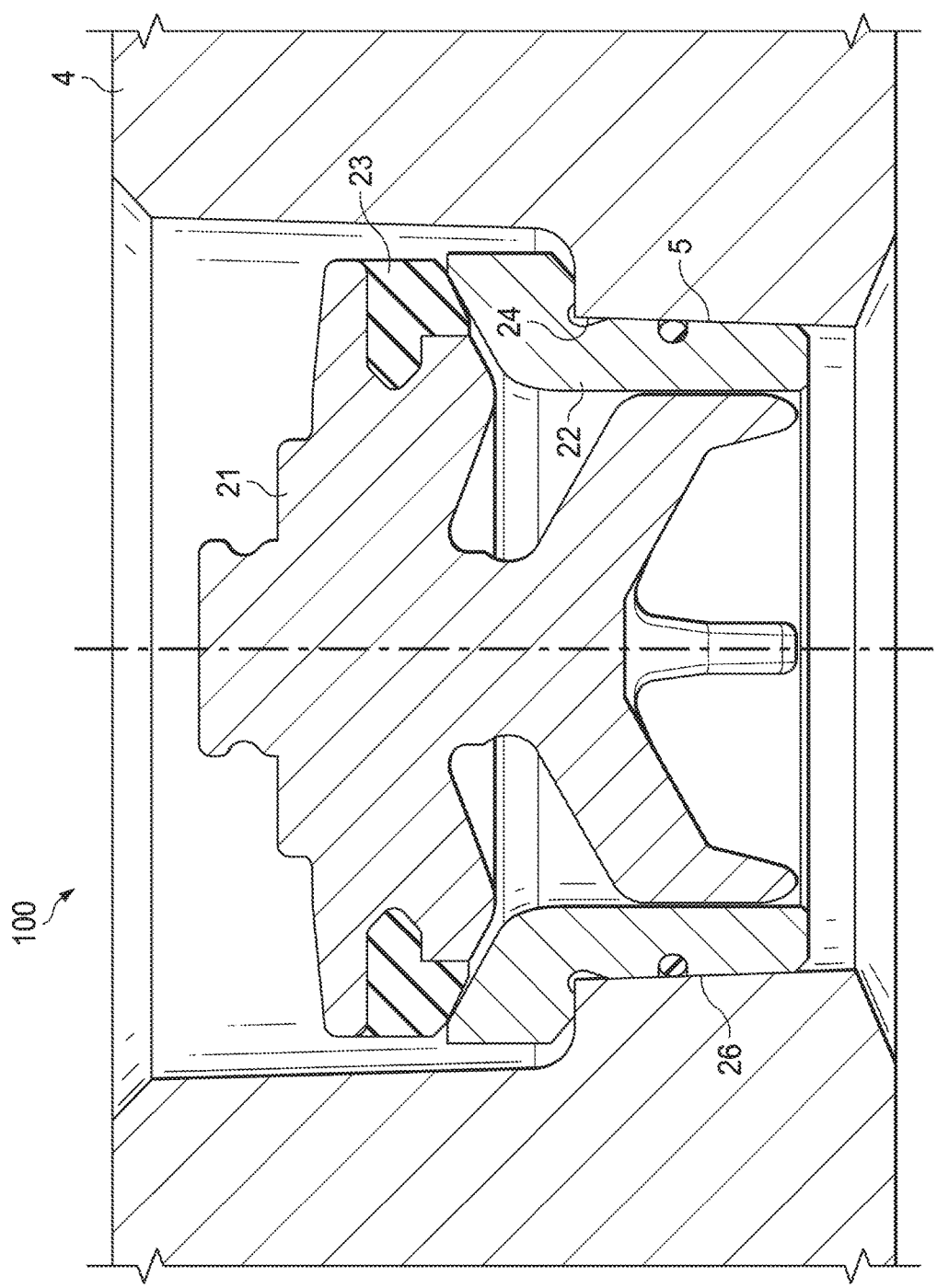
FIG. 1 is a sectioned view of a conventional well service pump valve and seat arrangement.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure.

FIG. 1 is a sectioned view of a conventional well service pump valve and seat arrangement 100. The arrangement 100 may have a valve 21 and a seat 22. The valve 21 may rest on the seat 22, and the seat 22 may be pressed into a fluid end 4 of a pump. Therefore, in some embodiments, the seat 22 may interact with the fluid end via a tapered press fit 5. In some examples, through the tapered press fit 5, an outer surface 26 of the seat 22 may contact an inner surface 24 of the fluid end 4. The tapered press fit 5 may impart friction between the outer surface 26 of the seat 22 and the inner surface 24 of the fluid end 4. In some examples, in order to extract the seat 22 from the fluid end 4, a hydraulic jack (not shown) may be required to overcome the friction between the outer surface 26 of the seat 22 and the inner surface 24 of the fluid end 4. In some embodiments, the valve and seat arrangement may also have a resilient seal 23. The seal 23 may prevent fluid from washing between the valve 21 and the seat 22.

Figure 2:
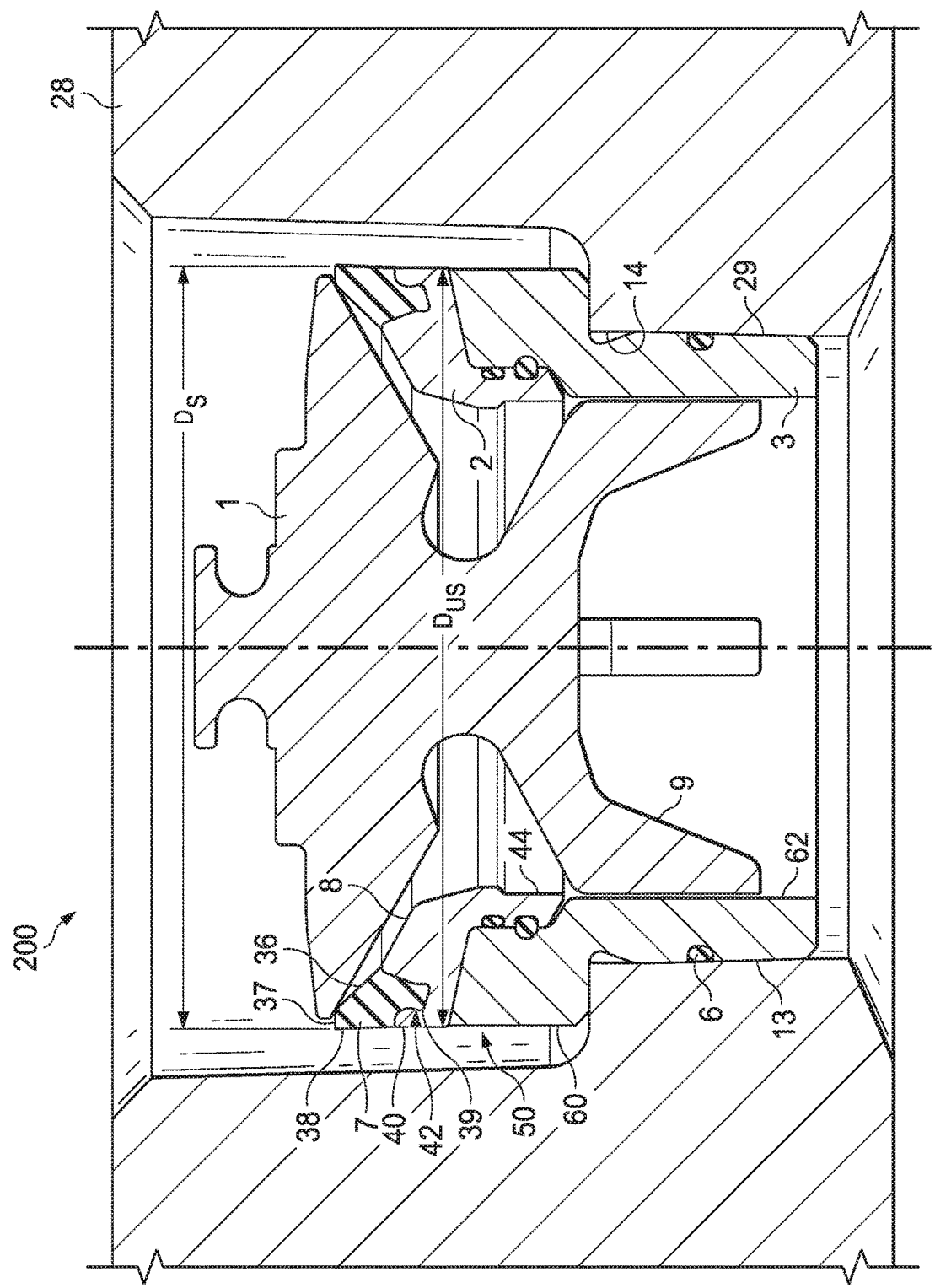
FIG. 2 is a sectioned view of a valve and seat assembly within a section of a fluid end according to one or more aspects of the present disclosure.

FIG. 2 is a sectioned view of a valve and seat assembly 200 within a section of a fluid end 28 according to one or more aspects of the present disclosure. In some embodiments, the assembly 200 includes a valve 1 and a seat 50. In this implementation, the seat 50 is a multi-piece seat that includes an upper seat 2, and a lower seat 3. The upper seat 2 and lower seat 3 may together, as seat 50, comprise a segmented valve seat positioned between the valve 1 and the fluid end 28 of a pump. The upper seat 2 and the lower seat 3 may comprise a quick change valve seat. In some examples, the upper seat 2 may serve as a strike face for the valve 1, and the upper seat 2 may also be a liner for the lower seat 3.

As shown in FIG. 2, the valve 1 sits upon the upper seat 2, and the upper seat 2 is releasably connected to the lower seat 3. In some embodiments, the lower seat 3 may be pressed into the fluid end 28 with a tapered fit 29 such that an outer surface 13 of the lower seat 3 contacts an inner surface 14 of the fluid end 28. The tapered fit 29 may impart friction between the outer surface 13 of the lower seat 3 and the inner surface 14 of the fluid end 28. In several examples, an optional o-ring 6 is placed between the lower seat 3 and the fluid end 28. The o-ring 6 may help ensure that there is a seal between the lower seat 3 and the fluid end 28. In the embodiment shown in FIG. 2, a hydraulic jack may be required to remove the lower seat 3 from the fluid end 28. However, a much lower force may be required to remove the upper seat 2 from the lower seat 3. Additionally, the assembly 200 further includes a resilient seal 7. The seal 7 may be bonded to the upper seat 2. Therefore, in some examples, the seal 7 may be in contact with both the valve 1 and the upper seat 2. In some examples, the upper seat 2 is made of metal.

As further shown in FIG. 2, the upper seat 2 includes an engagement surface 8, an outer surface 40, a channel 42, and an inner contact surface 44. The embodiment shown in FIG. 2 further illustrates that the lower seat 3 includes an outer surface 60 and an inner surface 62. Additionally, FIG. 2 shows that the seal 7 includes a contact surface 36, an upper surface 37, an outer surface 38, and a protrusion 39. In several embodiments, the protrusion 39 of the seal 7 fits within the channel 42 of the upper seat 2. This may provide for a more secure connection between the seal 7 and the upper seat 2. In some embodiments, the channel 42 is inwardly spaced from the outer surface 40 of the upper seat 2. The outer surface 38 of the seal 7 defines a diameter Ds. The outer surface 40 of the upper seat 2 defines a diameter Dus. In some embodiments, when the seal 7 is in a non-compressed state (e.g., when the valve 1 is in the open position), the diameter Ds may be substantially the same as the diameter Dus. In other embodiments, when the seal 7 is in a compressed state (e.g., the valve 1 is in the closed position), the diameter Ds may be larger than the diameter Dus due to outward deflection of the seal 7 when the seal 7 is compressed.

In some embodiments, one or more legs of a plurality of legs 9 of the valve 1 may be slideably received within the inner contact surface 44 of the upper seat 2 when the valve 1 is in the open position. In several cases, one or more legs of the plurality of legs 9 may be slideably received within the inner surface 62 of the lower seat 3 as well. The plurality of legs 9 may be slideably received within the inner surface 62 of the lower seat 3 when the valve 1 is in any one of the open position, the closed position, or both. In alternative embodiments, the legs 9 may not be slideably received within the inner surface 62.

In some embodiments, because the seal 7 is coupled to the upper seat 2 instead of the valve 1, the seal 7 experiences less fatigue than if the seal 7 was coupled to the valve 1. For example, when the valve 1 is pressed onto the upper seat 2, the seal 7 is free to expand outward, resulting in relatively low internal stresses in the seal 7. In some embodiments, when the seal 7 expands outward, the outer surface 38 of the seal 7 expands outward beyond the outer surface 40 of the upper seat 2 (see FIG. 4). Further, when the valve 1 is open, the seal 7 is able to deflect and reduce restriction of the fluid flow through the pump. Additionally, when the valve 1 is closed, the seal 7 is able to deflect inward under pressure and form a seal with the valve 1.

Figure 3:
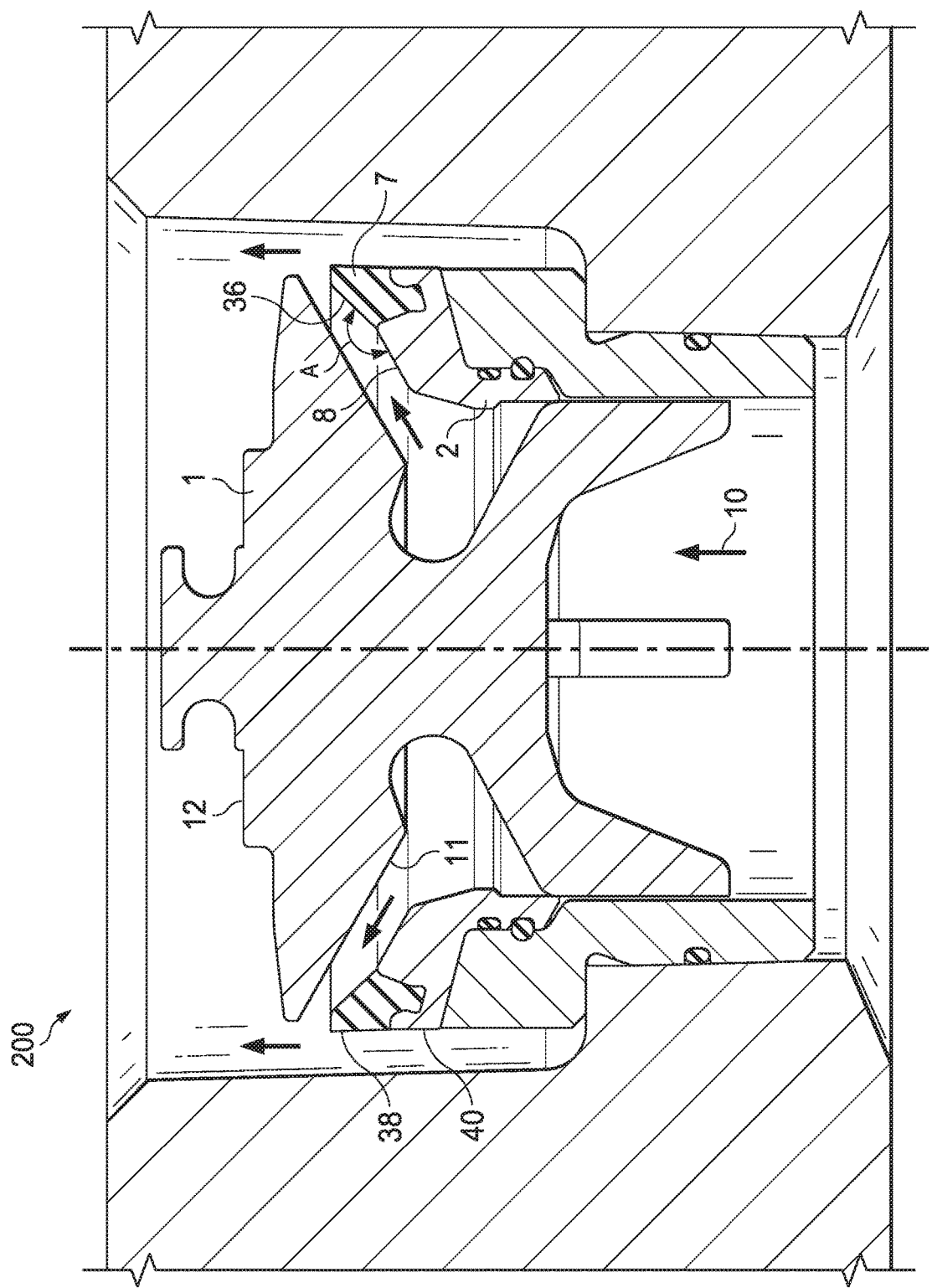
FIG. 3 is a sectioned view of the valve and seat assembly of FIG. 2 with the valve in an open position according to one or more aspects of the present disclosure.

FIG. 3 is a sectioned view of the valve and seat assembly 200 of FIG. 2 with the valve 1 in an open position according to one or more aspects of the present disclosure. In the embodiment shown in FIG. 3, the valve 1 is lifted off the upper seat 2. In some examples, the valve 1 may be lifted off the upper seat 2 by fluid pressure. For example, a pressure differential between the engagement surface 11 of the valve 1 and an upper surface 12 of the valve 1 opens the valve 1 and allows fluid to flow in a direction illustrated by arrow 10. Therefore, when the valve 1 is in the open position, the engagement surface 11 of the valve 1 is spaced from the engagement surface 8 of the upper seat 2 and from the contact surface 36 of the seal 7. In several examples, a biasing member (which may be a spring (not shown)) biases the valve 1 towards the upper seat 2 such that the engagement surface 11 of the valve 1 contacts the engagement surface 8 of the upper seat 2 and the contact surface 36 of the seal 7.

As shown in the embodiment of FIG. 3, when the valve 1 is in the open position, the contact surface 36 of the seal 7 is angled with respect to the engagement surface 8 of the upper seat 2. In this way, the contact surface 36 and the engagement surface 8 may meet at an angle A. In some embodiments, the angle A is 170°. The angle provided herein is for example only, and other embodiments may include smaller or larger angles. For example, in some implementations, the angle A may range from an angle smaller than 170° (e.g., 95°-170°) to an angle larger than 170° (e.g., 170°-180°). In other embodiments, the angle A may include a range of any other suitable angles. In alternative embodiments, the angle A is 180°. In such alternative embodiments, the engagement surface 8 of the upper seat 2 and the contact surface 36 of the seal 7 are parallel. In further alternative embodiments, the engagement surface 8 of the upper seat 2 and contact surface 36 of the seal 7 may be parallel, and the contact surface 36 may be proud with respect to the engagement surface 8.

Figure 4:
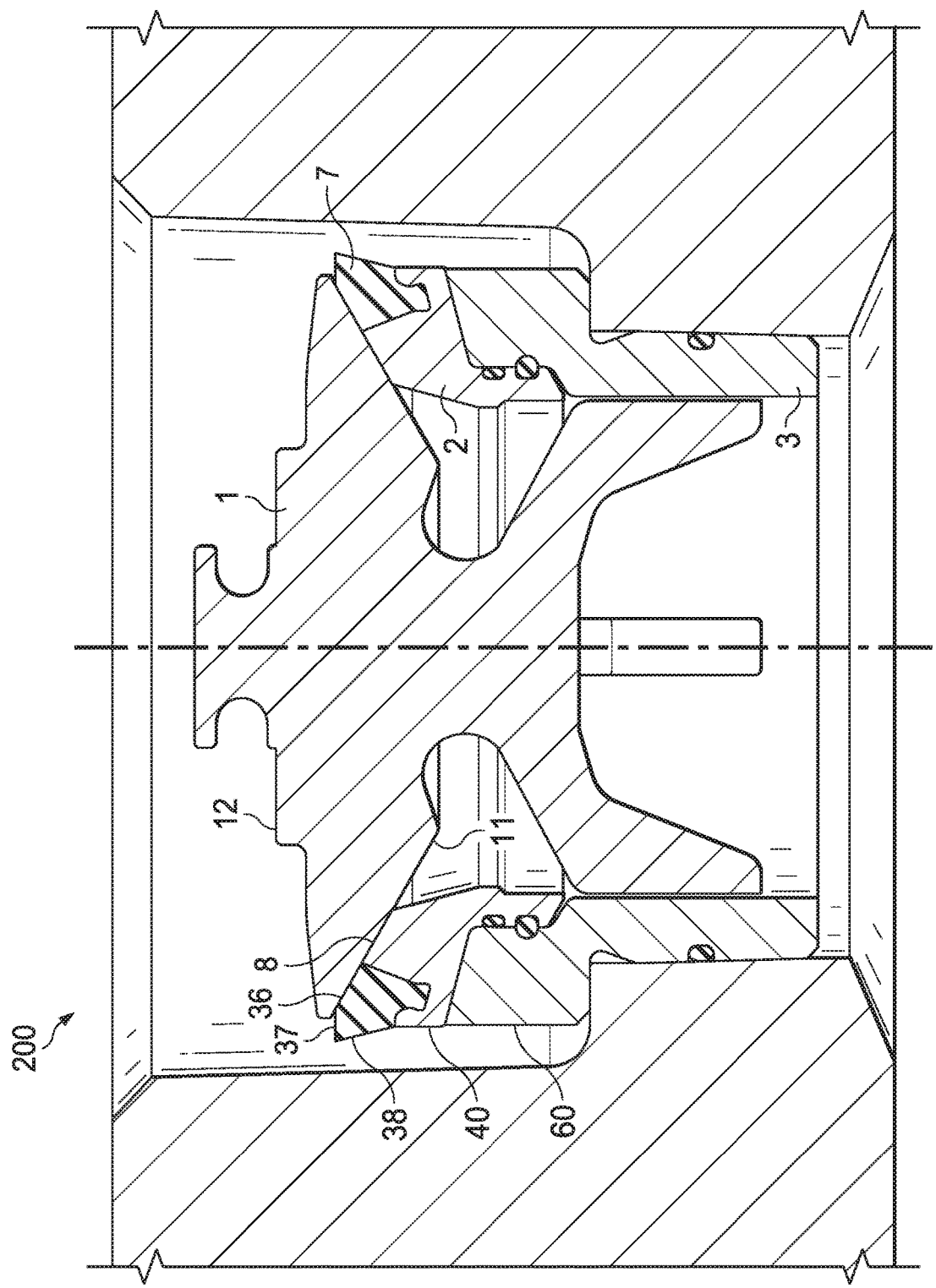
FIG. 4 is a sectioned view of the valve and seat assembly of FIG. 2 with pressure applied to the valve in a closed position according to one or more aspects of the present disclosure.

FIG. 4 is a sectioned view of the valve and seat assembly 200 of FIG. 2 with the valve 1 in a closed position according to one or more aspects of the present disclosure. In some embodiments, when the valve 1 is in the closed position, a pressure on the upper surface 12 of the valve 1 is greater than a pressure on the engagement surface 11 of the valve 1. Therefore, a sealable connection is made between the valve 1, the upper seat 2, and the seal 7. Accordingly, when the valve 1 is in the closed position, the engagement surface 11 of the valve 1 contacts the engagement surface 8 of the upper seat 2 and the contact surface 36 of the seal 7. In some embodiments, when the valve 1 transitions from the open position to the closed position, the engagement surface 11 of the valve 1 contacts the contact surface 36 of the seal 7 before contacting the engagement surface 8 of the upper seat 2. In other examples, when the valve 1 transitions from the open position to the closed position, the engagement surface 11 contacts the contact surface 36 of the seal 7 before contacting the upper surface 37. In other embodiments, when the valve 1 transitions from the open position to the closed position, the engagement surface 11 contacts the upper surface 37 of the seal 7 before contacting the contact surface 36. In still other embodiments, when the valve 1 transitions from the open position to the closed position, the engagement surface 11 contacts the upper surface 37 and the contact surface 36 at substantially the same time.

In several examples, when the engagement surface 11 of the valve 1 contacts the seal 7, the seal 7 is deformed, and the engagement surface 11 of the valve 1 then comes to rest upon the engagement surface 8 of the upper seat 2 and the contact surface 36 of the seal 7. When the engagement surface 11 of the valve 1 comes to rest upon the engagement surface 8 of the upper seat 2, the angle A between the contact surface 36 of the seal 7 and the engagement surface 8 of the upper seat 2 may generally be 180°. In alternative embodiments, when the valve 1 transitions from the open position to the closed position, the engagement surface 11 of the valve 1 contacts the contact surface 36 of the seal 7 and the engagement surface 8 of the upper seat 2 at substantially the same time. In several examples, the engagement surface 8 of the upper seat 2 is a hard strike face. In such examples, the engagement surface 11 of the valve 1 is also a hard strike face. Therefore, when the engagement surface 11 of the valve 1 contacts the engagement surface 8 of the upper seat 2, a seal is formed between two hard strike faces. This seal may be complete and unbroken along an entire surface area where the engagement surface 8 is in contact with the engagement surface 11. Thus, in several embodiments, when the valve 1 is in the closed position, there are no breaks in the seal between the hard strike faces of the engagement surface 8 and the engagement surface 11, and fluid cannot flow between the engagement surface 8 and the engagement surface 11. The engagement surface 11 of the valve 1 may be metal or any other suitably hard material. In some examples, the engagement surface 8 of the upper seat 2 may also be metal or any other suitably hard material. In this way, there may be metal-to-metal contact between the engagement surface 8 of the upper seat 2 and the engagement surface 11 of the valve 1 when the valve 1 is in the closed position.

Figure 5:
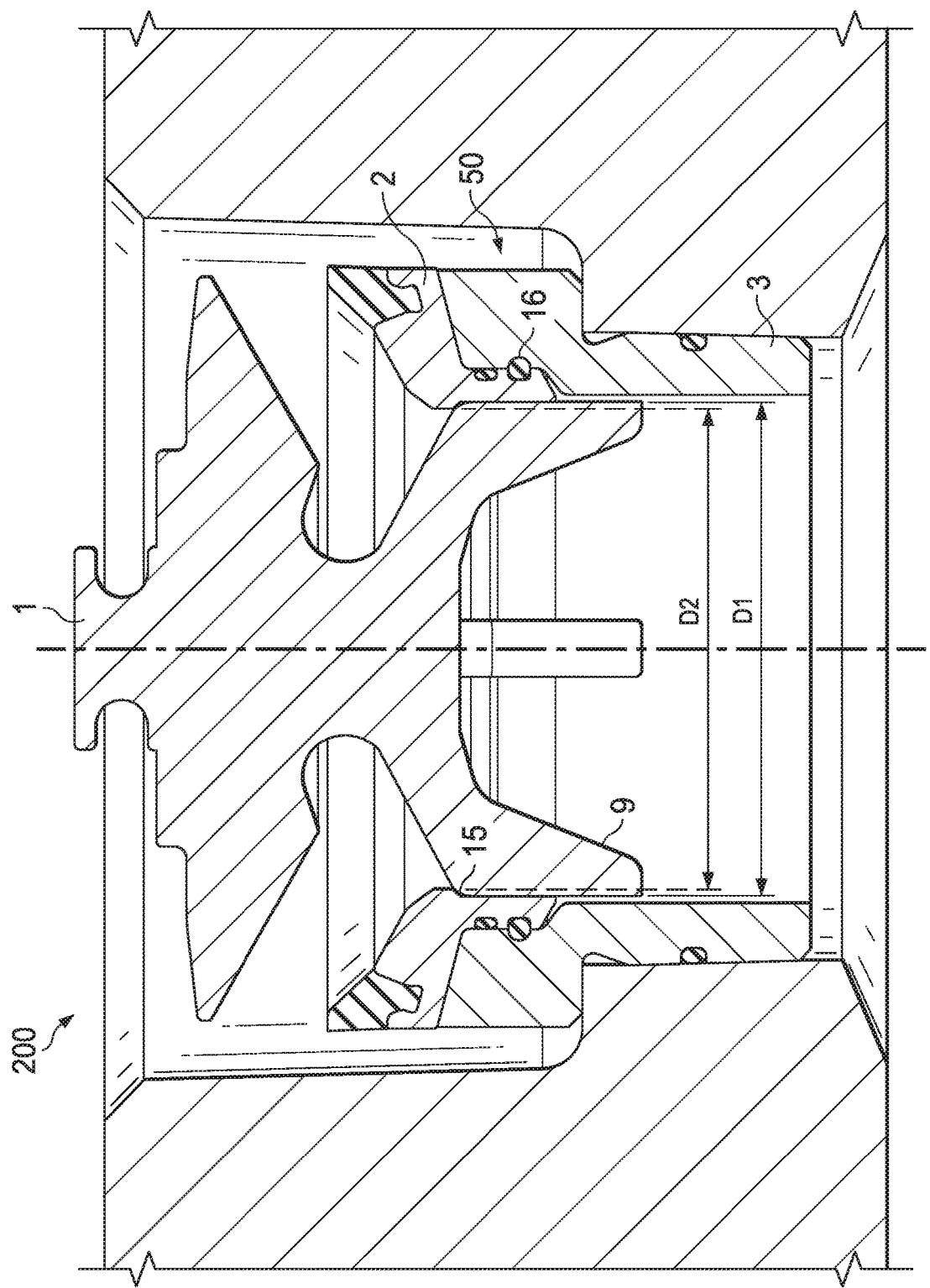
FIG. 5 is a sectioned view of the valve and seat assembly of FIG. 2 with the valve engaged with the upper seat according to one or more aspects of the present disclosure.
Figure 6:
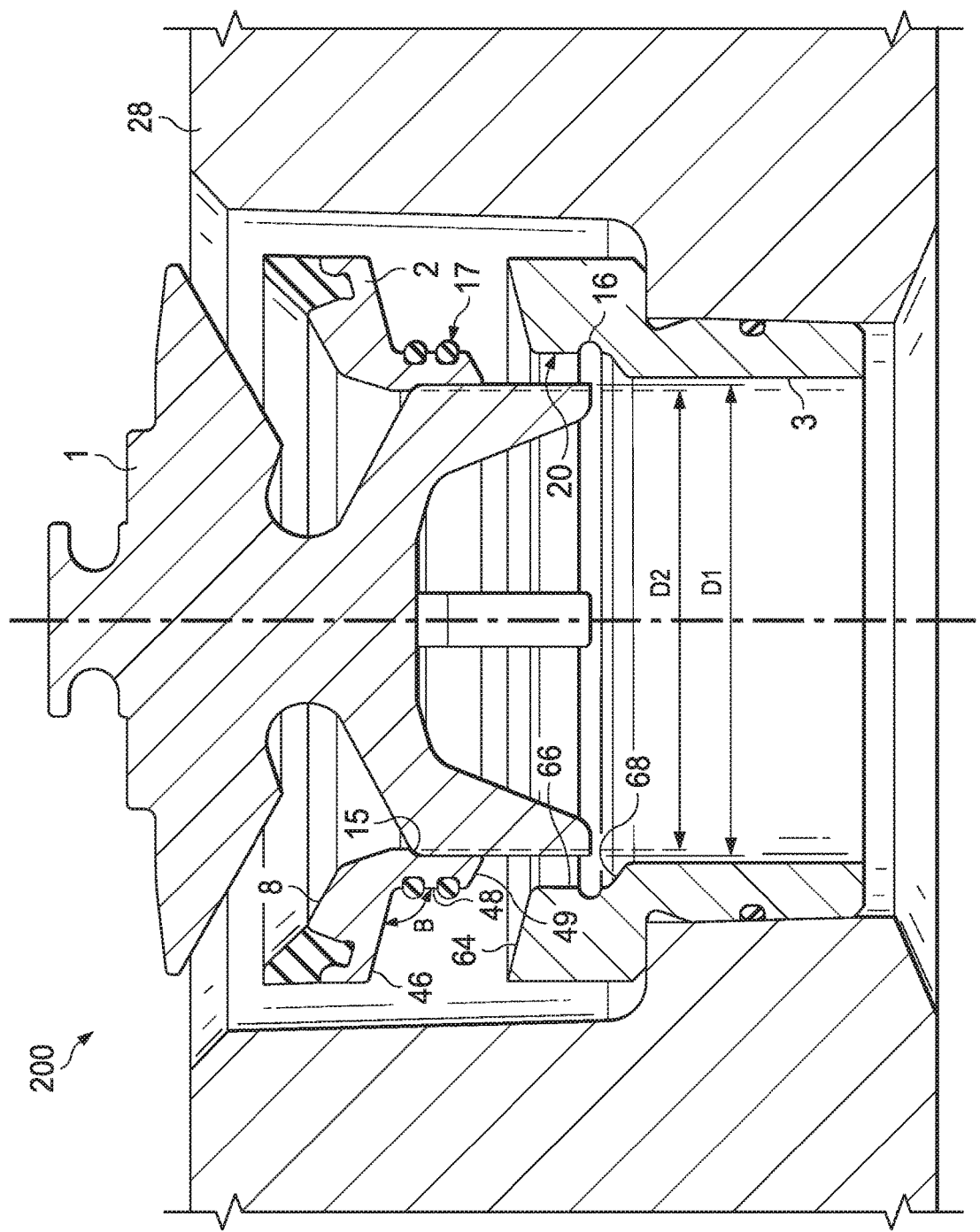
FIG. 6 is a sectioned view of the valve and seat assembly of FIG. 2 with the valve and upper seat pulled from the lower seat according to one or more aspects of the present disclosure.

FIG. 5 is a sectioned view of the valve and seat assembly 200 of FIG. 2 with the valve 1 engaged with the upper seat 2 according to one or more aspects of the present disclosure. Reference will also be made to FIG. 6, which is a sectioned view of the valve and seat assembly 200 of FIG. 2 with the valve 1 and upper seat 2 pulled from the lower seat 3 according to one or more aspects of the present disclosure. The embodiments of FIGS. 5 and 6 illustrate a disassembly of the segmented seat 50. In several examples, the valve 1 is pulled upwards for removal in a direction away from the lower seat 3. In some embodiments, the plurality of valve legs 9 have an outer diameter D1. In some examples, the upper seat 2 includes a shoulder 15 that has an inner diameter D2. The outer diameter D1 of the plurality of valve legs 9 may be greater than the inner diameter D2 of the shoulder 15 of the upper seat 2. In several embodiments, when the valve 1 is pulled upward, the plurality of legs 9 engage the shoulder 15, as shown in FIG. 5. Therefore, pulling the valve 1 upward beyond the position illustrated in FIG. 4 will lift the upper seat 2 upward as well.

Figure 7:
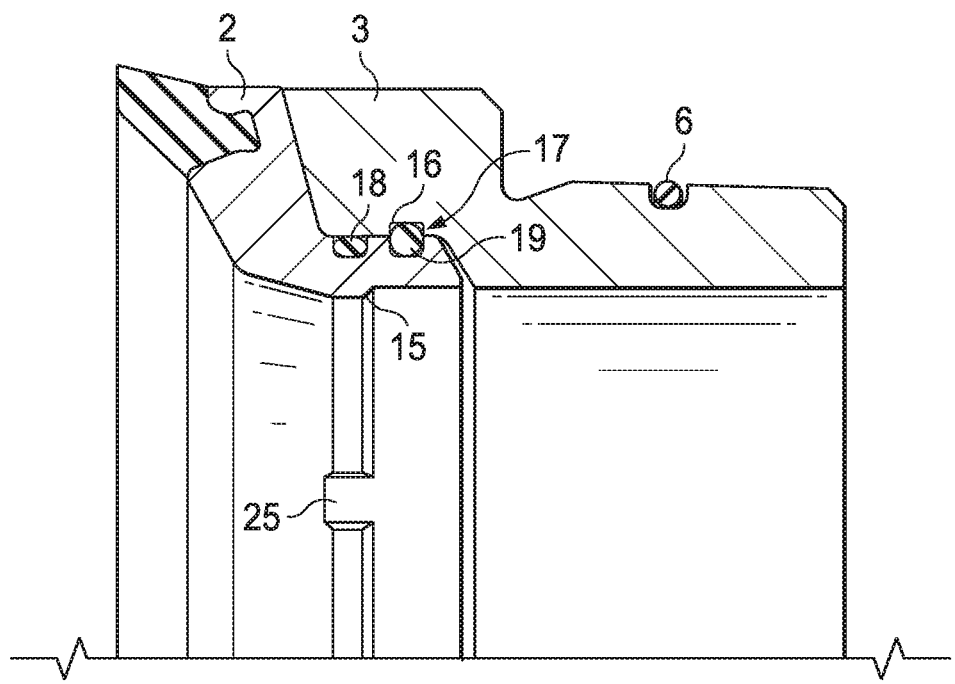
FIG. 7 is a sectioned partial view of a latch mechanism to help ensure the upper seat and lower seat stay coupled according to one or more aspects of the present disclosure.

In some embodiments, such as the embodiment shown in FIG. 6, the upper seat 2 includes a mechanical coupler mechanism 17. In some examples, the coupler mechanism 17 may form a friction fit, such as an interference fit, between the upper seat 2 and the lower seat 3. The degree of interference of the interference fit may range from light interference to strong interference. The upper seat 2 may be more easily decoupled from the lower seat 3 when the interference fit is a light interference fit than when the interference fit is a strong interference fit. In other implementations, the coupler mechanism 17 may be a latch mechanism, a detent mechanism, or any other coupler mechanism. With reference to FIG. 7, for example, the coupler mechanism 17 may include a latch 19 that utilizes some form of mechanical interference to maintain the upper seat 2 and the lower seat 3 together in a coupled state. In some embodiments, the latch 19 is an elastomeric o-ring. In such embodiments, the latch 19 is a seal. As further shown in FIG. 6, the lower seat may include a bore 20. In embodiments when the latch 19 is a seal, the latch 19 may deform as it is pressed through the bore 20. In other embodiments, the coupler mechanism 17 may include a coil spring or any other suitable material that deforms during installation as it is pressed through the bore 20. Further discussion regarding embodiments when the latch 19 is a seal is provided below with respect to FIG. 7.

In some embodiments, the lower seat 3 includes a groove 16 sized and shaped to receive the coupler mechanism 17. In several examples, when the upper seat 2 is lifted upward, the coupler mechanism 17 may disengage with the groove 16, which results in the upper seat 2 also being removed from the fluid end 4. In such examples, the upper and lower seats 2, 3 are in a decoupled state. In some examples, notches (e.g., notches 25 in FIG. 7) may be machined on the inner diameter D2 of the shoulder 15 of the upper seat 2 to facilitate the assembly of the valve 1 and the upper seat 2 with greater ease. The amount of diametrical interference between the outer diameter D1 of the plurality of legs 9 and the inner diameter D2 of the shoulder 15 may be such that pressing the valve 1 through the upper seat 2 (e.g., when installing the assembly 200) will not result in permanent deformation of either component in the event the notches 25 are not present.

As shown in the embodiment of FIG. 6, the upper seat 2 further includes a lower engagement surface 46, a latch surface 48, and a lower contact surface 49. As further shown in FIG. 6, the lower seat 3 further includes an engagement surface 64, a latch surface 66, and a contact surface 68. In some embodiments, the lower engagement surface 46 and the latch surface 48 may meet at an angle B. In some embodiments, the angle B is 100°. The angle provided herein is for example only, and other embodiments may include smaller or larger angles. For example, in some implementations, the angle B may range from an angle smaller than 100° (e.g., 90°-100°) to an angle larger than 100° (e.g., 100°-180°). As one example, the angle B may range from 0° to 180°. In other embodiments, the angle B may include a range of any other suitable angles.

With respect to the upper seat 2, in some embodiments, the lower engagement surface 46 may not be parallel with the engagement surface 8. In other embodiments, the lower engagement surface 46 may not be parallel with the lower contact surface 49. In alternative embodiments, though, the lower engagement surface 46 may be parallel with one or both of the engagement surface 8 and the lower contact surface 49.

With reference to FIG. 5, when the upper seat 2 and the lower seat 3 are in a coupled state, the lower engagement surface 46 of the upper seat 2 is in contact with the engagement surface 64 of the lower seat 3. The lower engagement surface 46 may be generally parallel with the engagement surface 64. As further shown in FIG. 5, when the upper seat 2 and the lower seat 3 are in the coupled state, the latch surface 48 of the upper seat 2 is slideably received within the latch surface 66 of the lower seat 3. Additionally, FIG. 5 illustrates that when the upper seat 2 and the lower seat 3 are in the coupled state, the lower contact surface 49 of the upper seat 2 may not contact the contact surface 68 of the lower seat 3 (e.g., the lower contact surface 49 may be spaced from the contact surface 68). In other embodiments, when the upper seat 2 and the lower seat 3 are in the coupled state, the lower contact surface 49 of the upper seat 2 may be in contact with the contact surface 68 of the lower seat 3. The lower contact surface 49 may be generally parallel with the contact surface 68.

As discussed above, the upper seat 2 may be decoupled from the lower seat 3 as a result of the plurality of legs 9 of the valve 1 engaging the shoulder 15 of the upper seat 2 when the valve 1 is pulled upward. As shown in the embodiment of FIG. 6, when the upper seat 2 and the lower seat 3 are in the decoupled state, the lower engagement surface 46 of the upper seat 2 is spaced from the engagement surface 64 of the lower seat 3.

FIG. 7 is a sectioned partial view of the coupler mechanism 17, which helps ensure the upper seat 2 and lower seat 3 stay together according to one or more aspects of the present disclosure. In some embodiments, once installed, the coupler mechanism 17 expands into the groove 16 of the lower seat 3. Additionally, as discussed above, in embodiments when the latch 19 is a seal, the seal 19 prevents fluid from passing between the upper seat 2 and the lower seat 3. As further discussed above with respect to FIG. 6, in some examples, the coupler mechanism 17 forms an interference fit between the upper seat 2 and the lower seat 3. In such examples, the interference fit maintains the upper seat 2 and the lower seat 3 in the coupled configuration. The degree of interference of the interference fit may range from light interference to strong interference. The upper seat 2 may be more easily decoupled from the lower seat 3 when the interference fit is a light interference fit than when the interference fit is a strong interference fit. In several examples, a seal 18 prevents fluid from passing between the upper seat 2 and the lower seat 3. In some embodiments, a plurality of notches 25 pass through the shoulder 15 and provide a passage for the valve 1 to be assembled with the upper seat 2.

Figure 8:
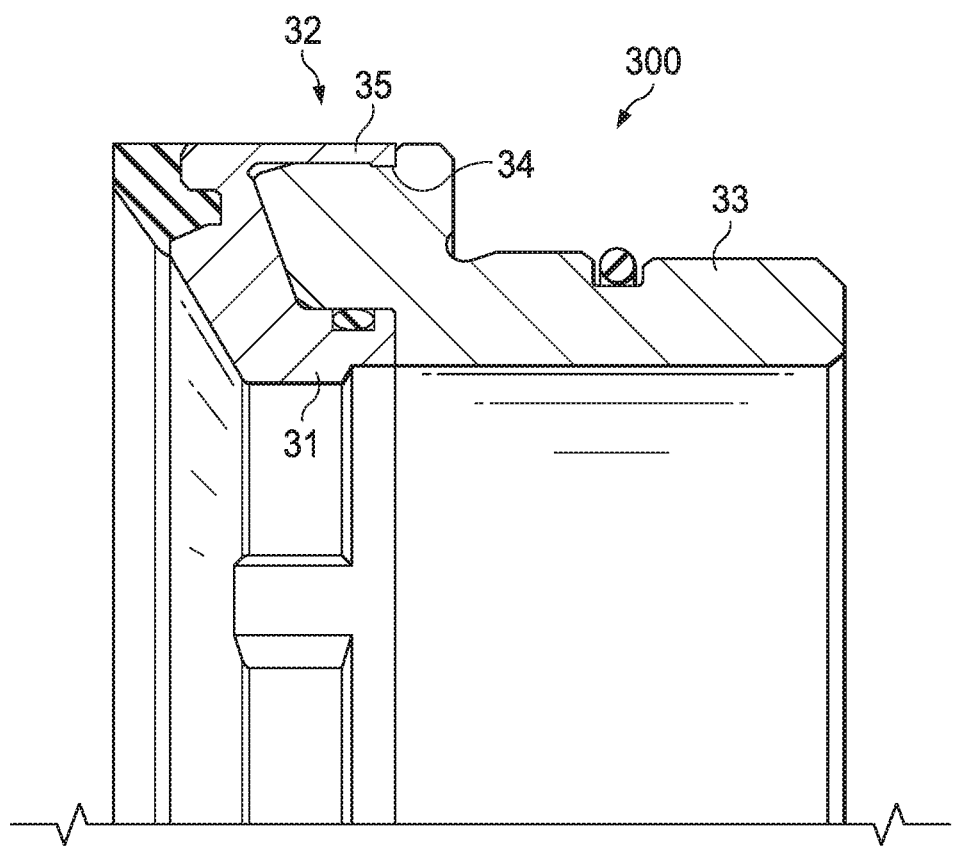
FIG. 8 is a sectioned partial view showing an alternative latch mechanism according to one or more aspects of the present disclosure.
Figure 10:
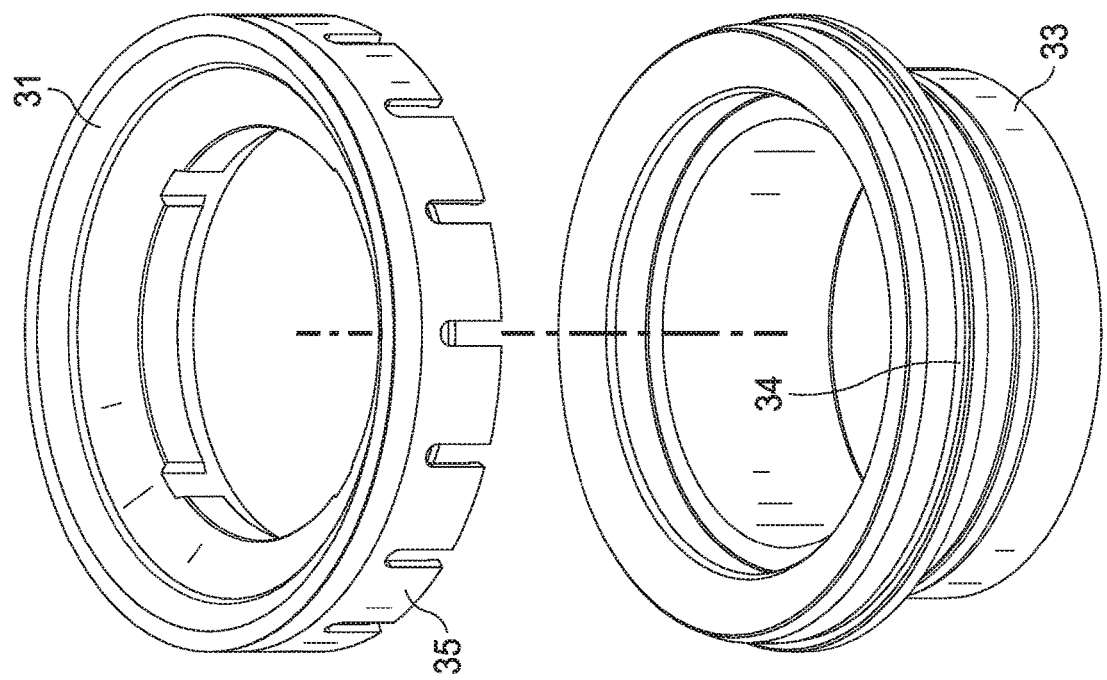
FIG. 10 is an exploded perspective view of the alternative upper and lower seats including the latch mechanism of FIG. 8 according to one or more aspects of the present disclosure.
Figure 9:
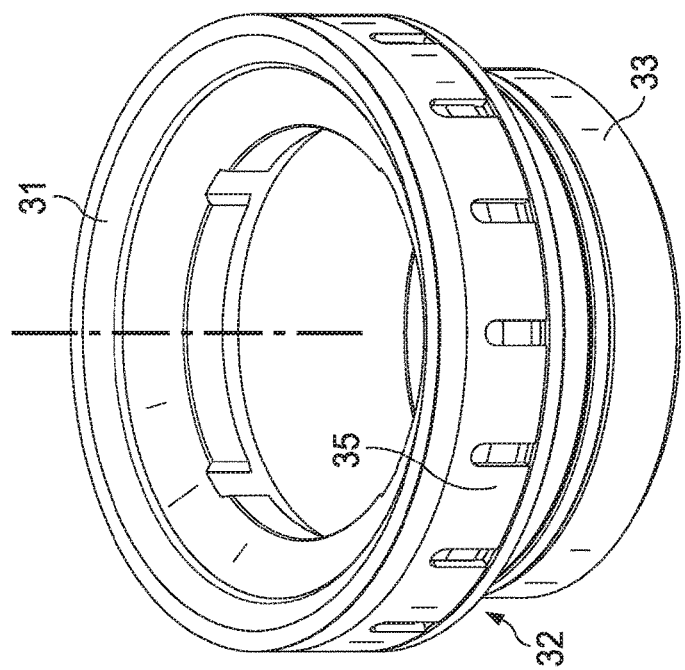
FIG. 9 is a perspective view of alternative upper and lower seats including the latch mechanism of FIG. 8 according to one or more aspects of the present disclosure.

FIG. 8 is a sectioned partial view showing an alternative latch mechanism 32 and valve assembly 300, which includes upper and lower seats 31, 33 according to one or more aspects of the present disclosure. FIG. 9 is a perspective view of valve assembly 300. FIG. 10 is an exploded perspective view of the upper and lower seats 31, 33 including the latch mechanism 32 of FIG. 8 according to one or more aspects of the present disclosure. The upper seat 31 may be substantially similar to and include substantially all the features of the upper seat 2, and any differences will be discussed in further detail below. The lower seat 33 may be substantially similar to and include substantially all the features of the lower seat 3, and any differences will be discussed in further detail below.

In several embodiments, the upper seat 31 may include a latch mechanism 32. The latch mechanism 32 may include a plurality of tabs 35 spaced around a perimeter of the upper seat 31. In several examples, the plurality of tabs 35 may be equidistantly spaced around the perimeter of the upper seat 31. The number of tabs may vary, but may be within a range of two to 100 tabs, although more or fewer tabs are contemplated. In alternative examples, the plurality of tabs 35 may be non-equidistantly spaced around the perimeter of the upper seat 31. In some examples, the lower seat 33 includes a groove 34 sized and shaped to receive the plurality of tabs 35. As shown in the embodiment of FIG. 8, when the upper seat 31 is pressed onto the lower seat 33, each tab of the plurality of tabs 35 snaps into the groove 34 on the lower seat 33. In some embodiments, the plurality of tabs 35 may be a metallic material. In such embodiments, the plurality of tabs 35 may act as a cantilever spring so that each tab of the plurality of tabs 35 does not yield before each tab snaps into the groove 34.

Figure 11:
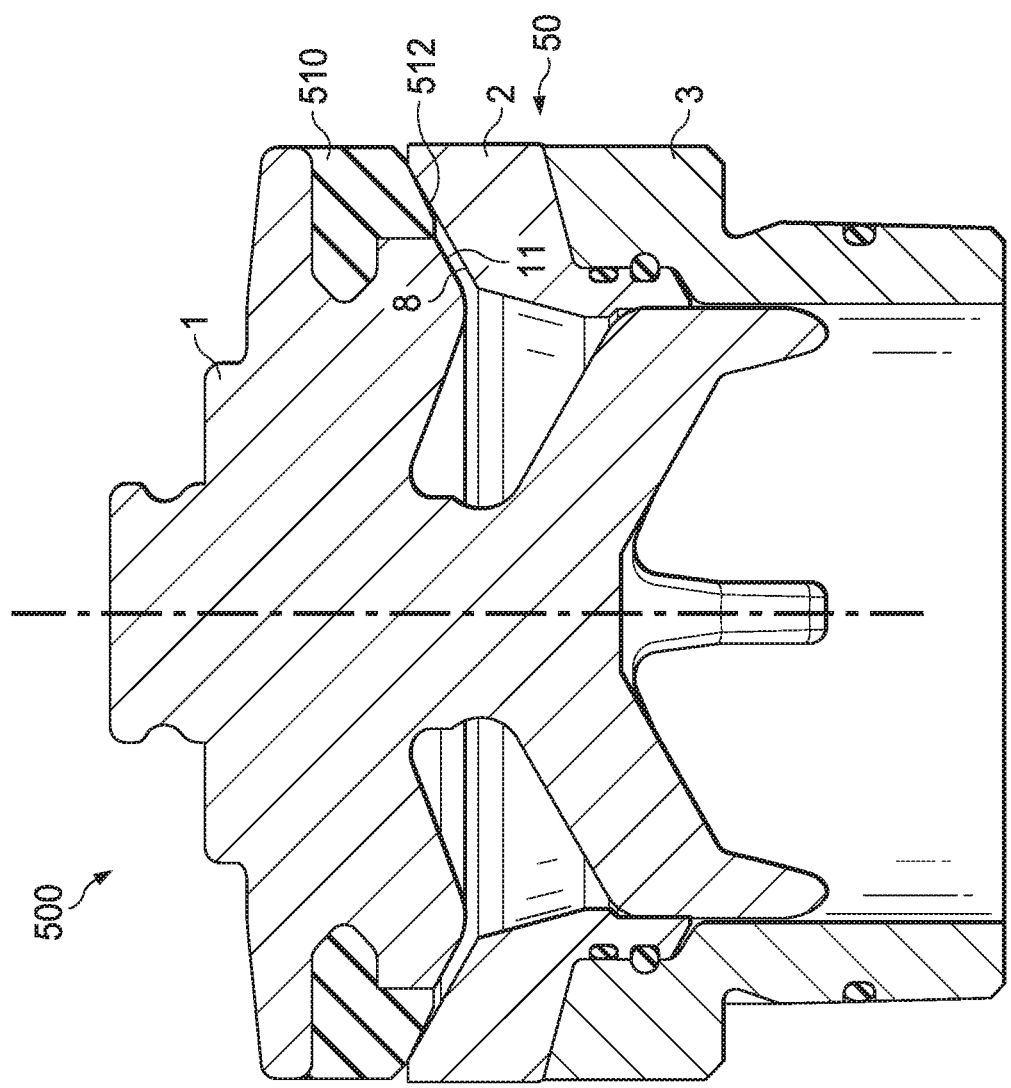
FIG. 11 is a sectioned view of an alternative valve and seat assembly with a seal coupled to a valve according to one or more aspects of the present disclosure.

FIG. 11 is a sectioned view of an alternative valve and seat assembly with a seal coupled to a valve according to one or more aspects of the present disclosure. In alternative embodiments, an alternative valve assembly 500 includes the valve 1, the seat 50, which includes the upper seat 2 and the lower seat 3, and a seal 510. The seal 510 may be bonded to the valve 1. As further shown in FIG. 11, the seal includes a contact surface 512. In several examples, when the contact surface 512 contacts the engagement surface 8 of the upper seat 2, the seal 510 is deformed, and the engagement surface 11 of the valve 1 then comes to rest upon the engagement surface 8 of the upper seat 2. In some embodiments, when the valve 1 transitions from the open position to the closed position, the contact surface 512 of the seal 510 contacts the engagement surface 8 of the upper seat 2 before the engagement surface 11 of the valve 1 contacts the engagement surface 8. In still other embodiments, when the valve 1 transitions from the open position to the closed position, the contact surface 512 and the engagement surface 11 contact the engagement surface 11 at substantially the same time.

FIG. 12 is a sectioned view of an alternative valve and seat assembly with the valve in an open position according to one or more aspects of the present disclosure. In alternative embodiments, an alternative valve assembly 400 includes a valve 410, a seat 420, and a seal 430. The valve 410 may be substantially similar to the valve 1 of FIG. 2. The seal 430 may be substantially similar to the seal 7 of FIG. 2. The seal 430 may be bonded to the seat 420. Therefore, in some examples, the seal 430 may be in contact with both the valve 410 and the seat 420. In several embodiments, the seat 420 is one, single component. In some examples, the seat 420 is made of metal.

In several examples, the seat 420 may function in the same manner as the combination of the upper and lower seats 2, 3 of FIG. 2. For example, as discussed above with respect to FIG. 2, in some embodiments, the seat 420 may be pressed into the fluid end 28 of a pump, as shown in FIG. 2. In some examples, the seat 420 includes a tapered fit such that an outer surface 422 of the seat 420 contacts an inner surface 14 of the fluid end 28. The tapered fit may impart friction between the outer surface 422 of the seat 420 and the inner surface 14 of the fluid end 28.

In some embodiments, a hydraulic jack may be required to overcome the friction between the outer surface 422 of the seat 420 and the inner surface 14 of the fluid end 28 in order to extract the seat 420 from the fluid end 28. In such embodiments, the seal 430 experiences less fatigue than if the seal 430 was bonded to the valve 410. For example, when the valve 410 is pressed onto the seat 420, the seal 430 is free to expand outward, resulting in relatively low internal stresses. Further, when the valve 410 is open, the seal 430 is able to deflect and reduce restriction of the fluid flow through the pump. Additionally, when the valve 410 is closed, the seal 430 is able to deflect inward under pressure and form a seal with the valve 410.

As further shown in FIG. 12, the seat 420 includes an outer surface 422, an engagement surface 424, and an inner surface 425. The embodiment shown in FIG. 12 further illustrates that the seal 430 includes an outer surface 432, a contact surface 434, and an upper surface 436. The seal 430 will be discussed in greater detail below with respect to FIG. 13. In some embodiments, a plurality of legs 405 of the valve 410 may be slideably received within the inner surface 425 of the seat 420 when the valve 410 is in the open position. This contact may occur when the valve 410 is in any one of the open position, the closed position, or both. In alternative embodiments, the legs 405 may not contact the inner surface 425.

In some examples, when the valve 410 is in the open position, an outer surface 432 of the seal 430 is substantially parallel with the outer surface 422 of the seat 420. In alternative embodiments, when the valve 410 is in the open position, the outer surface 432 of the seal 430 may extend outward beyond the outer surface 422 of the seat 420. In further alternative embodiments, when the valve 410 is open, the outer surface 432 of the seal 430 may extend inward toward an engagement surface 412 of the valve 410. In some embodiments, when the valve 410 is in the closed position, the seal 430 may expand outward, and the outer surface 432 of the seal 430 may expand outward beyond the outer surface 422 of the seat 420.

In several embodiments, as fluid flows past the valve 410, in a direction of flow illustrated by the arrow 10 (FIG. 3), a pressure differential between the engagement surface 412 of the valve 410 and an upper surface 414 of the valve 410 opens the valve 410 and allows fluid flow. Therefore, when the valve 410 is in the open position, the engagement surface 412 of the valve 410 is spaced from an engagement surface 424 of the seat 420 and from the seal 430. In several examples, a biasing member (which may be a spring (not shown)) biases the valve 410 towards the seat 420 such that the engagement surface 412 of the valve 410 contacts the engagement surface 424 of the seat 420 and the seal 430.

In some embodiments, when the valve 410 is in the closed position, a pressure on the upper surface 414 of the valve 410 is greater than a pressure on the engagement surface 412 of the valve 410. Therefore, a sealable connection is made between the valve 410, the seat 420, and the seal 430. Accordingly, when the valve 410 is in the closed position, the engagement surface 412 of the valve 410 contacts the engagement surface 424 of the seat 420 and the seal 430. In some embodiments, when the valve 410 transitions from the open position to the closed position, the engagement surface 412 of the valve 410 contacts the seal 430 before contacting the engagement surface 424 of the seat 420. In several examples, when the engagement surface 412 of the valve 410 contacts the seal 430, the seal 430 is deformed, and the engagement surface 412 of the valve 410 then comes to rest upon the engagement surface 424 of the seat 420 and the contact surface 434 of the seal 430. When the engagement surface 412 of the valve 410 comes to rest upon the engagement surface 424 of the seat 420, the angle C between the contact surface 434 of the seal 430 and the engagement surface 424 of the seat 420 may generally be 180°. In some embodiments, when the valve 410 transitions from the open position to the closed position, the engagement surface 412 contacts the contact surface 434 of the seal 430 before contacting the upper surface 436. In other embodiments, when the valve 410 transitions from the open position to the closed position, the engagement surface 412 contacts the upper surface 436 of the seal 430 before contacting the contact surface 434. In still other embodiments, when the valve 410 transitions from the open position to the closed position, the engagement surface 412 contacts the upper surface 436 and the contact surface 434 at substantially the same time.

In several examples, the engagement surface 424 of the seat 420 is a hard strike face. In such examples, the engagement surface 412 of the valve 410 is also a hard strike face. Therefore, when the engagement surface 412 of the valve 410 contacts the engagement surface 424 of the seat 420, a seal is formed between two hard strike faces. This seal may be complete and unbroken along an entire surface area where the engagement surface 424 is in contact with the engagement surface 412. Thus, in several embodiments, there are no breaks in the seal between the hard strike faces of the engagement surface 424 and the engagement surface 412. When the valve 410 is in the closed position, fluid cannot flow between the engagement surface 424 and the engagement surface 412. The engagement surface 412 of the valve 410 may be metal or any other suitably hard material. In some examples, the engagement surface 424 of the seat 420 may also be metal or any other suitably hard material. In this way, there may be metal-to-metal contact between the engagement surface 424 of the seat 420 and the engagement surface 412 of the valve 410 when the valve 410 is in the closed position.

FIG. 13 is a sectioned view of a seal of the alternative valve and seat assembly of FIG. 12 according to one or more aspects of the present disclosure. As shown in the embodiment of FIG. 13, the seal 430 further includes a protrusion 438. Additionally, FIG. 13 illustrates that the seat 420 includes a channel 426. In several embodiments, the protrusion 438 of the seal 430 fits within the channel 426 of the seat 420. This may provide for a more secure connection between the seal 430 and the seat 420. In some embodiments, the channel 426 is inwardly spaced from the outer surface 422 of the seat 420. In some embodiments, when the seal 430 is in a non-compressed state (e.g., when the valve 410 is in the open position), the upper surface 436 of the seal 430 may be substantially perpendicular to the outer surface 432 of the seal 430. In other embodiments, the upper surface 436 and the outer surface 432 may not be perpendicular such that when the seal 430 is in a non-compressed state, the outer surface 432 extends outward beyond the outer surface 422 of the seat 420.

As further shown in the embodiment of FIG. 13, when the valve 410 is in the open position, the contact surface 434 of the seal 430 may be angled with respect to the engagement surface 424 of the seat 420. In this way, the contact surface 434 and the engagement surface 424 may meet at an angle C. In some embodiments, the angle C is 170°. The angle provided herein is for example only, and other embodiments may include smaller or larger angles. For example, in some implementations, the angle C may range from an angle smaller than 170° (e.g., 95°-170°) to an angle larger than 170° (e.g., 170°-180°). In other embodiments, the angle C may include a range of any other suitable angles. In alternative embodiments, the angle C is 180°. In such alternative embodiments, the engagement surface 424 of the seat 420 and the contact surface 434 of the seal 430 are parallel.

Persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A valve seat assembly, comprising:
   a valve;
   a removable upper seat associated with the valve, the upper seat comprising an elastically deformable latch; and
   a lower seat configured to be inserted into a fluid end of a pump and releasably couplable to the upper seat, the lower seat comprising a groove,
   wherein the upper seat is decouplable from the lower seat while the lower seat remains inserted in the fluid end of the pump,
   wherein in a coupled state, the latch of the upper seat extends into the groove of the lower seat, and wherein in a decoupled state, the latch is removed from the groove,
   wherein when moving from the coupled state to the decoupled state, the latch is elastically deformable to displace from the groove as the upper seat is displaced from the lower seat, and
   wherein in the coupled state, the valve is configured to contact the upper seat to prevent a flow of fluid through the fluid end of the pump.

2. The valve seat assembly of claim 1, wherein in the decoupled state, the upper seat is configured to decouple from the lower seat while the lower seat remains inserted in the fluid end of the pump.

3. The valve seat assembly of claim 1, further comprising a seal configured to prevent a flow of fluid through the fluid end of the pump, wherein the seal is coupled to the upper seat.

4. The valve seat assembly of claim 3, wherein the valve comprises an engagement surface, wherein the upper seat comprises an engagement surface, and wherein the engagement surface of the valve is configured to contact the seal and the engagement surface of the upper seat to prevent the flow of fluid through the fluid end of the pump.

5. The valve seat assembly of claim 4, wherein a contact surface of the seal is disposed adjacent to the engagement surface of the upper seat at an angle, and wherein the engagement surface of the valve is configured to contact the contact surface of the seal before contacting the engagement surface of the upper seat when the valve moves toward a closed position.

6. The valve seat assembly of claim 1, further comprising a seal configured to prevent a flow of fluid through the fluid end of the pump, wherein the seal is coupled to the valve.

7. The valve seat assembly of claim 1, wherein in the coupled state, the latch of the upper seat prevents a flow of fluid between the upper seat and the lower seat.

8. A valve seat assembly, comprising:
a valve comprising an engagement surface;
a seal configured to permit unidirectional flow of fluid through a fluid end of a pump;
a removable upper seat comprising an engagement surface and an elastically deformable latch; and
a lower seat configured to be inserted into the fluid end of the pump and releasably couplable to the upper seat, the lower seat comprising a groove,
wherein the upper seat is decouplable from the lower seat while the lower seat remains inserted in the fluid end of the pump,
wherein in a coupled state, the latch of the upper seat extends into the groove of the lower seat, and wherein in a decoupled state, the latch is removed from the groove,
wherein when moving from the coupled state to the decoupled state, the latch is elastically deformable to displace from the groove as the upper seat is displaced from the lower seat, and
wherein the engagement surface of the valve is configured to contact the seal and the engagement surface of the upper seat to permit the unidirectional flow of fluid through the fluid end of the pump.

9. The valve seat assembly of claim 8, wherein the seal comprises a contact surface disposed adjacent to the engagement surface of the upper seat at an angle, and wherein the engagement surface of the valve is configured to contact the contact surface of the seal before contacting the engagement surface of the upper seat when the valve moves toward a closed position.

10. The valve seat assembly of claim 9, wherein when the valve is in the closed position, the contact surface of the seal and the engagement surface of the upper seat are substantially parallel.

11. The valve seat assembly of claim 8, wherein in the coupled state, the latch of the upper seat prevents a flow of fluid between the upper seat and the lower seat.

12. The valve seat assembly of claim 8, wherein the valve further comprises a plurality of legs, wherein the upper seat comprises a shoulder, and wherein the plurality of legs of the valve are configured to contact the shoulder of the upper seat when the valve is removed from the fluid end of the pump.

13. The valve seat assembly of claim 12, wherein the contact between the plurality of legs of the valve and the shoulder of the upper seat is configured to cause the upper seat to be removed from the fluid end of the pump.

14. The valve seat assembly of claim 13, wherein when the upper seat is removed from the fluid end of the pump, the upper seat decouples from the lower seat while the lower seat remains inserted in the fluid end of the pump.

15. A valve seat assembly, comprising:
a valve comprising an engagement surface;
a seat insertable into a fluid end of a pump, the seat comprising:
a removable first portion comprising an engagement surface and an elastically deformable latch; and
a second portion configured to be inserted into the fluid end of the pump and releasably couplable to the first portion, the second portion comprising a groove, wherein the first portion is decouplable from the second portion while the second portion remains inserted in the fluid end of the pump; and
a seal coupled to the first portion of the seat, the seal configured to permit unidirectional flow of fluid through the fluid end of the pump, the seal comprising a contact surface,
wherein in a coupled state, the latch of the first portion of the seat extends into the groove of the second portion of the seat, and wherein in a decoupled state, the latch is removed from the groove,
wherein when moving from the coupled state to the decoupled state, the latch is elastically deformable to displace from the groove as the first portion of the seat is displaced from the second portion of the seat, and
wherein the engagement surface of the valve is configured to contact the seal and the engagement surface of the first portion of the seat to permit the unidirectional flow of fluid through the fluid end of the pump, wherein the contact between the engagement surface of the valve and the engagement surface of the first portion of the seat is continuous along the engagement surface of the first portion of the seat.

16. The valve seat assembly of claim 15, wherein the contact surface of the seal is disposed adjacent to the engagement surface of the first portion of the seat at an angle, and wherein the engagement surface of the valve is configured to contact the contact surface of the seal before contacting the engagement surface of the first portion of the seat when the valve moves toward a closed position.

17. The valve seat assembly of claim 16, wherein when the valve is in the closed position, the contact surface of the seal and the engagement surface of the first portion of the seat are substantially parallel.

18. The valve seat assembly of claim 15, wherein when the valve is in an open position, an outer surface of the seal and an outer surface of the first portion of the seat are substantially parallel.

19. The valve seat assembly of claim 15, wherein in the coupled state, the latch of the first portion of the seat prevents a flow of fluid between the first portion of the seat and the second portion of the seat.

20. A valve seat assembly, comprising:
a valve comprising a plurality of legs;
a removable upper seat associated with the valve, the upper seat comprising a shoulder; and a lower seat configured to be inserted into a fluid end of a pump and releasably couplable to the upper seat, wherein the upper seat is decouplable from the lower seat while the lower seat remains inserted in the fluid end of the pump, wherein the plurality of legs of the valve are configured to contact the shoulder of the upper seat when the valve is removed from the fluid end of the pump, and wherein the valve is configured to contact the upper seat to prevent a flow of fluid through the fluid end of the pump.

21. A valve seat assembly, comprising:

a valve comprising a plurality of legs;

a removable upper seat associated with the valve, the upper seat comprising a shoulder and a plurality of guide notches, the plurality of guide notches formed in an inner surface of the upper seat; and a lower seat configured to be inserted into a fluid end of a pump and releasably couplable to the upper seat, wherein the upper seat is decouplable from the lower seat while the lower seat remains inserted in the fluid end of the pump, wherein the plurality of legs of the valve are configured to contact the shoulder of the upper seat when the valve is removed from the fluid end of the pump, and wherein the valve is configured to contact the upper seat to prevent a flow of fluid through the fluid end of the pump.

22. A valve seat assembly for a fluid end of a pump, comprising:

a valve;

a removable upper seat associated with the valve to permit unidirectional flow of fluid;

a lower seat configured to be inserted into the fluid end of the pump and releasably couplable to the upper seat, the upper seat and the lower seat defining an axis through the valve seat assembly; and a latch configured to couple the upper seat to the lower seat, wherein the latch is configured to release the upper seat from the lower seat in an axial direction in response to a single action of applying a separating force applied in the axial direction to the upper seat.

23. The valve seat assembly of claim 22, wherein the latch is a deformable ring extending around an outer wall of the upper seat and in contact with an inner surface of the lower seat.

24. The valve seat assembly of claim 22, wherein the latch is an elastically deformable ring.

25. The valve seat assembly of claim 22, wherein the latch is a deformable ring disposable in grooves formed in facing surfaces of the upper seat and the lower seat, the deformable ring being the only physically overlapping structure that mechanically prevents removal of the upper seat from the lower seat.

* * * * *